United States Patent [19]

Boutin et al.

[11] 4,178,221

[45] Dec. 11, 1979

[54] PROCESS FOR THE PREPARATION OF WATER-SOLUBLE ACRYLIC POLYMERS BY PHOTOPOLYMERIZATION

[75] Inventors: Jean Boutin, Saint-Priest; Jean Neel, Lyons, both of France

[73] Assignee: Rhone-Poulenc Industries, Paris, France

[21] Appl. No.: 786,659

[22] Filed: Apr. 11, 1977

[30] Foreign Application Priority Data

Apr. 14, 1976 [FR] France .................................. 76 11634

[51] Int. Cl.$^2$ ............................ C08F 2/46; C08F 4/00
[52] U.S. Cl. ........................... 204/159.23; 204/159.22; 427/54.1; 428/461; 428/463; 526/65; 526/88; 526/240; 526/392; 526/303; 526/312; 526/317; 526/923
[58] Field of Search ...................... 204/159.22, 159.23; 526/303, 88; 427/54

[56] References Cited

U.S. PATENT DOCUMENTS

| | | | |
|---|---|---|---|
| 2,921,006 | 1/1960 | Schmitz et al. | 204/159.22 |
| 3,615,454 | 10/1971 | Cescon et al. | 204/159.23 |
| 3,655,483 | 4/1972 | Borrel et al. | 156/272 |
| 3,666,645 | 5/1972 | Ransohoff | 204/159.22 |
| 3,666,693 | 5/1972 | Chapiro et al. | 204/159.17 |
| 3,732,193 | 5/1973 | Svarz | 526/88 |
| 3,764,502 | 10/1973 | Restaino | 204/159.22 |
| 3,807,052 | 4/1974 | Troue | 204/159.23 |
| 3,840,448 | 10/1974 | Osborn et al. | 204/159.14 |
| 3,912,607 | 10/1975 | Communal | 204/159.23 |
| 3,929,602 | 12/1975 | Kaetsu et al. | 204/159.22 |
| 3,930,064 | 12/1975 | Sander | 204/159.22 |
| 3,948,740 | 4/1976 | Phalangas | 204/159.23 |
| 4,024,296 | 5/1977 | Gruber | 204/159.23 |
| 4,025,407 | 5/1977 | Chang et al. | 204/159.14 |
| 4,032,701 | 6/1977 | Hughes | 526/303 |

FOREIGN PATENT DOCUMENTS

| | | |
|---|---|---|
| 2115706 | 10/1971 | Fed. Rep. of Germany ...... 204/159.22 |
| 2421020 | 11/1974 | Fed. Rep. of Germany ...... 204/159.22 |
| 654026 | 5/1951 | United Kingdom . |
| 1332247 | 10/1973 | United Kingdom . |
| 1377829 | 12/1974 | United Kingdom . |
| 1511821 | 1/1976 | United Kingdom . |

OTHER PUBLICATIONS

Chem. Abs., (88), 90278, (14), "Water Soluble, Primarily Linear, High Molecular Polymers," Hercules Corp.

*Primary Examiner*—Herbert J. Lilling
*Attorney, Agent, or Firm*—Burns, Doane, Swecker & Mathis

[57] ABSTRACT

Water-soluble acrylic polymers are prepared by a sequential photopolymerization process. A monomer solution is deposited on a support which is subsequently irradiated to effect polymerization. Photopolymerization promoters are incorporated in the monomer solution to facilitate polymerization.

29 Claims, No Drawings

PROCESS FOR THE PREPARATION OF WATER-SOLUBLE ACRYLIC POLYMERS BY PHOTOPOLYMERIZATION

BACKGROUND OF THE INVENTION

1. Field of the Invention

The present invention relates to a process for the preparation of water-soluble acrylic polymers by photopolymerization.

2. Description of the Prior Art

The polymerization of acrylic monomers in dilute aqueous solutions to obtain polymers in the form of gels has long been known. However, such processes require the product gel to be dried and ground which is economically disadvantageous, since the dehydration of a gel is a long and costly operation.

In the particular case of polymers of high molecular weight and high water-solubility, initially obtained from a relatively concentrated solution of monomers, the viscosity continuously increases during polymerization, and it is very difficult to achieve good and efficient stirring of the reaction mixture and suitable dissipation of the heat of reaction. Tremendous difficulties too have been encountered with a polymerization solution having a percentage of dissolved monomers of about 20%.

In French Pat. No. 1,518,053, filed Feb. 21, 1967, a polymerization method employing an aqueous solution containing 30 to 50% of monomers is described, in which a heat-dissipating container is used as the polymerization vessel. This method eliminates the need to stir the reaction mixture, but requires a certain cooling device to remove the heat generated. The polymerization time is quite long and the rubbery mass obtained must be subjected to the aforenoted drying/grinding operations.

French Pat. No. 2,064,729 describes a process for obtaining solid, high molecular weight water-soluble acrylic polymers or copolymers utilizing either a continuous or discontinuous process beginning with a concentrated aqueous solution of monomers preferably having a pH between 8 and 13. The process consists of adding to the initial solution of monomers a photoinitiator, preferably an alkyl of benzoin, in quantities between 0.05 and 10% by weight relative to the monomers, depositing the solution as a thin layer or droplets on a fixed or movable waterproof support, and, finally, subjecting the coated support to irradiation with light for 30 seconds to 15 minutes. This process affords acrylic polymers and copolymers having very valuable properties, particularly in the field of flocculating agents, due to their high molecular weight and high water-solubility.

Nevertheless, until the present invention it has not been possible to obtain high molecular weight polymers devoid of insoluble fractions and/or unpolymerized monomer.

Thus, there remains a need in the art for an economically advantageous means of preparing high molecular weight, water-soluble acrylic polymers lacking insoluble factions and unpolymerized monomer. This need is especially acute in the field of water purification and treatment where regulations exist which limit the quantity of residual monomer which may be present in the polymer system; for example, the F.D.A. has established 0.05% as the maximum residual monomer concentration.

SUMMARY OF THE INVENTION

Accordingly, a primary object of the present invention is the obtainment of polymers containing insignificant amounts of unpolymerized monomer or other water insoluble material.

Another object of the invention is to obtain water-soluble polymers having a high intrinsic viscosity, preferably greater than 8 dl/g, preferably greater than 14 dl/g.

The present invention accomplishes the aforementioned objects by providing a process for the preparation of water-soluble acrylic polymers particularly useful in the area of water purification and treatment, comprising continuously depositing on a support an aqueous solution of acrylic monomer, monomers or comonomers containing a photopolymerization promoter and only minor amounts of dissolved oxygen, and sequentially irradiating the coated support to effect polymerization.

DETAILED DESCRIPTION OF THE INVENTION

More particularly, the process of the invention comprises:

[a] continuously depositing on a support a thin layer of an aqueous solution comprising acrylic monomer or monomers and about 0.005 to 1%, preferably about 0.01 to 0.05%, by weight relative to said monomer or monomers of a photopolymerization promotor, said solution containing less than about 1 mg, preferably less than about 0.5 mg of dissolved oxygen per liter of solution;

[b] subjecting the thin liquid layer on the support to radiation of wavelengths between about 300 and 450 m$\mu$, preferably between about 330 and 400 m$\mu$, in a gaseous atmosphere having an oxygen concentration less than about 5% by volume, preferably less than about 0.5%, for approximately 1 to 20 minutes, preferably about 3 to 7 minutes, wherein the average power of the active radiation is between 20 and 300 watt/m$^2$, while cooling said support to remove the heat of reaction;

[c] maintaining the cooled support in an atmosphere substantially free of oxygen as in step [b] while subjecting same to radiation of wavelengths between about 300 and 450 m$\mu$ for approximately 1 to 20 minutes, preferably about 3 to 10 minutes, wherein the average power of the active radiation is greater than about 300 but less than about 2,000 watt/m$^2$; and

[d] detaching the resultant, partially solidified thin layer from the support and subjecting it to radiation of wavelengths between about 300 and 450 m$\mu$, preferably between about 330 and 400 m$\mu$ for approximately 30 minutes to 3 hours, preferably about 40 to 90 minutes, in an atmosphere containing preferably cool air, wherein the average of the active radiation is between about 20 and 500 watts/m$^2$.

The above-described process produces the acrylic polymer or copolymer directly in the form of a relatively thin layer or film.

According to one embodiment of the invention, an active photopolymerization initiator, preferably one that is soluble in the monomer or monomers, is added to the monomer or to the mixture of monomers. Thereafter the monomer or the comonomers are dissolved in water and the solution is deposited, in the form of a layer having a thickness between about 3 and 20 mm and preferably between about 3 and 8 mm, on a waterproof support.

According to another embodiment of the invention, an acrylamide solution containing the photoinitiator is deposited on a support to form a thin layer about 0.1 to 1 mm thick. The deposited solution is then polymerized by exposure to ultraviolet light for about 2 to 4 minutes. The polyacrylamide layer thus obtained may serve as a sub-layer upon which additional monomer solutions may be deposited and polymerized. In such cases the aqueous monomer solution deposited on the coated support is subjected to a very rapid polymerization by irradiation with light. Because of the high polymerization rate, either continuous or discontinuous methods may be employed. However, the continuous method is economically preferable for industrial production. One such continuous method is accomplished by conveying the water-proof support upon which the polymerization reactants are deposited under a series of lamps which provide the necessary radiation.

It is necessary to conduct the polymerization in an atmosphere substantially free of oxygen for at least the first irradiation phase. In this regard, it is helpful to remove, by any known means, as much of the dissolved oxygen existing in the water required for dissolving the monomers as possible. Moreover, the support upon which the monomer solution is deposited is maintained in a closed chamber which is purged with a stream of inert gas such as nitrogen. According to a preferred embodiment, the upper portion of this chamber is made of a transparent material which allows the passage of radiation emitted by lamps disposed outside the chamber. Although they stop a considerable portion of the ultraviolet rays, sheets of glass can be used.

A cooling device situated under the lower face of the support removes the heat produced by the polymerization reaction. It is also possible to remove the heat of reaction by sprinkling the support with cool water. In any event, the surface temperature of the thin layer should be less than about 70° C. and preferably less than about 60° C. The light source preferably has a radiation maximum between about 2700 Å and 5000 Å, more preferably between about 3000 Å and 4000 Å, and desirably is filtered to minimize any radiation below 3000 Å, which latter radiation is degradative and gives rise to the formation of the objectionable by-product. No advantage accrues from using radiation with wavelengths above 5000 Å.

Because the nature and use of the irradiation are characteristic features of the invention, the electric power of the lamps used should be clearly distinguished from the average power of active radiation to avoid confusion. Average power of the active radiation is defined as the average, in space and time, of the power of the ultraviolet radiation which reaches the solution of monomers and activates the photopolymerization.

The energy supplied per unit surface area of the solution affects the rate of polymerization of the monomer or monomers and the resulting molecular weight of the polymer or copolymer product. Additionally, in the case of continuous polymerization, it affects the length and unwinding speed of the belt used to transport the coated support.

The three successive irradiation phases are independent. However, it is advantageous for the concentration of residual monomer to be less than about 1% and preferably less than about 0.5%, after the first two phases. The initial polymerization rate must be very rapid. To accomplish this the pH of the monomer solution, the quantity of photoinitiator, the intensity of irradiation and the monomer concentration are adjusted.

Because the high molecular weight acrylic polymers or copolymers produced are highly adhesive, it is necessary to use a support which is sufficiently waterproof to enable the final products to be readily removed without the fixed strip or to the movable belt. The strip or belt is not critical and may be of various types, for example, a fluorinated polyolefin support, or a metal which may or may not be covered by a waterproof plastic film or the like.

The instant invention is used to accomplish polymerization and copolymerization, in aqueous solution, of acrylic derivatives. By "acrylic derivatives" or "monomers," there are intended such functional monomers as acrylamide, methacrylamide, acrylonitrile or methacrylonitrile, acrylic and methacrylic acids and their salts and esters, and aminoalkyl acrylates and methacrylates and their quaternized derivatives, and hydroxyalkyl (meth) acrylates.

The concentration of the aqueous solution can be varied to accommodate the particular characteristics of the monomers. For example, when acrylamide and the alkali metal acrylates are employed, concentration is usually between about 20 and 60% by weight and preferably between about 40 and 50%. In the preparation of a cationic polymer, for example, a polymer derived from aminoalkyl methacrylate chloride, the concentration may be higher: between about 40 and 85% by weight and preferably between about 60 and 80%. The term cationic polymer denotes a polymer whose chain includes electro-positive sites. If a copolymer of acrylamide and a quaternized aminoalkyl methacrylate is desired, the concentration of the monomers should be preferably between about 40 and 70%.

The solution of the monomer or comonomers must contain a photopolymerization initiator, preferably one that is soluble in the solution, before deposition on the support. The initiator may be added to the aqueous solution or dissolved in one of the monomers prior to preparation of the aqueous solution. The prepared solution can be stored in the absence of light before deposition on the support to prevent premature activity.

The photoinitiators contemplated by the invention are well known. Among the most active are diacetyl, dibenzoyl, benzophenone and more particularly, benzoin and its alkyl ether derivatives, such as, for example, the methyl, ethyl and propyl ethers. The amount of initiator depends on the particular compound selected, its activity and the distance between the source of radiation and the support. The requisite amount can vary within wide limits, generally between about 0.005 and 1% by weight relative to the weight of monomer or monomers employed and preferably between about 0.01 and 0.5%.

Employing a soluble photoinitiator avoids the use of a third solvent which can give rise to secondary reactions with the monomers, prejudicing the solubility in water of the final polymer or copolymer.

Employing free-radical transfer agents (also termed "polymerization modifiers") is not obligatory. However, the presence of about 0.1 to 6%, relative to the monomers, of such material, particularly those selected from the group consisting of isopropanol and glycerol, aids the photopolymerization.

The preparation of the reaction mixture can be accomplished by various methods, including mixing all reagents in a single batch and using intermediate mixtures. However, it is imperative that these mixtures be prepared in the substantial absence of oxygen and, when the photoinitiator is added in the absence of light.

The acrylic polymers and copolymers obtained by the process of the invention exhibit valuable properties for industrial application, primarily as a result of high molecular weight, high water-solubility and the absence of free monomer. They have utility in the field of flocculating and thickening agents and are particularly useful in the field of water treatment, for example, in the purification of drinking water.

In order to further illustrate the present invention and the advantages thereof, the following specific examples are given, it being understood that same are intended merely as illustrative and in no way limitative.

EXAMPLE 1

A solution was prepared in a dissolving tank comprising:

| | |
|---|---|
| acrylamide | 45.6 kg |
| acrylic acid | 16.9 kg |
| 50% strength by weight aqueous sodium hydroxide solution | 18.8 kg |
| demineralized water | 68.7 kg |

The solution was charged to three mixers in series. The first received solution of sodium hydroxide diluted to 30% strength, causing the pH to be adjusted to 13 when the solution was deposited on the steel strip where the polymerization occurred. Nitrogen was introduced at the base of the second and third mixers until the solution contained no more than 0.15 mg of dissolved oxygen per liter of solution. Additionally, a solution of 34 g of benzoin isopropyl ether per liter of acrylic acid was introduced, with stirring, into the third mixer. The outside of the mixer was painted black to prevent penetration of light. A metering pump ensured a flow rate of 88 cm$^3$/h. Optionally, a solution of polymerization modifiers could be introduced upstream or downstream of the third mixer. The de-aerated aqueous monomer solution flowed continuously at a rate of 31 l/h along a strip of stainless steel 48 cm wide, having two similar lateral edges to avoid lateral flow. The strip was slightly inclined in the direction of entrance which prevent the solution from flowing backwards. The gaseous atmosphere above the strip was bounded by glass plates and was maintained free oxygen by purging with nitrogen. The metal strip moved at a speed of about 24 cm per minute. At this speed, the thickness of the layer of monomer solution was about 4.5 mm. The strip, while having its lower portion cooled with 15° C. water, was exposed to a sequence of irradiation along a length of 3.6 m comprising the following phases (1) "phase b": over 165 cm, 23 low pressure mercury vapor lamps, each having an electric power of 40 watts (trademark Philips TLAK 40 w/05), were fitted perpendicularly to the direction of travel of the strip and at 10 cm from the latter, providing an average received power of ultraviolet radiation of about 80 w/m$^2$, taking into account the various losses; (2) "phase c": over the remaining 195 cm, four high pressure mercury vapor lamps were fitted, each having an electric power of 2,000 watts (trademark Philips HTQ 7). These four lamps were fitted in the direction of travel of the strip and provided to a power of ultraviolet radiation of about 400 watts/m$^2$. The duration of the irradiation phases b and c was about 15 minutes.

The table of operations was as follows:

| Irradiation length | Surface temperature | Nature of the product |
|---|---|---|
| 30 cm | 28° C. | thread-forming product |
| 60 cm | 40° C. | viscous product |
| 90 cm | 42° C. | plastic product |
| 120 cm | 42° C. | plastic product |
| 150 cm | 32° C. | plastic product |

The expression "thread-forming product" denotes a solution that has attained a sufficiently high viscosity for it to flow slowly, like an oil, without breaking up into drops. By viscous product is meant a liquid having approximately the viscosity of honey. By plastic product is meant a gel having a rubbery consistency.

After 15 minutes of irradiation a plastic film was obtained which was detached from the strip by a simple pulling action. Thereafter, a third irradiation in air, "phase d," was effected for 1 hour by placing the film under radiation of the same intensity as that used over the first 165 centimeters of the stainless steel strip.

Thereafter the film was broken into fragments, dried for 15 minutes at about 85° C., and then ground into powder. The properties of the polymer were tested while in powder or fragment form.

A solution of 5 g per liter in demineralized water was prepared at ambient temperature (about 20° C.) by slow stirring with a magnetic stirrer. The solution thus prepared was examined for the presence of insoluble matter by filtering over glass frit, the diameter of whose pores was between 90 and 150$\mu$. No deposit was found.

Using this same solution and another solution containing an additional 50 g/l of NaCl, the Brookfield viscosity was measured at 20° C. and at 10 revolutions per minute using the nos. 1 or 3 cups and models, depending on the viscosity of the solution.

Thereafter, the concentration of residual monomer was determined chromatographically after extraction with a methanol/water mixture containing 80% by volume of methanol and 20% of water.

The following results were obtained on the final powder:

| | | |
|---|---|---|
| Brookfield viscosity | aqueous solution | 3950 cpo |
| | saline solution | 315 cpo |
| intrinsic viscosity | | 17.6 dl/g |
| concentration of residual monomer | | 0.04 |

EXAMPLE 2

The procedure described in Example 1 was repeated. However, the aqueous monomer solution comprised:

| | |
|---|---|
| acrylamide | 75 kg |
| demineralized water | 75 kg |

The solution of benzoin diisopropyl ether was added at the rate of 98 cm$^3$/hours.

The pH was regulated to 12.

For the phases b and c the table of operations is as follows:

| Irradiation length | Surface temperature | Nature of the product |
| --- | --- | --- |
| 30 cm | 35° C. | thread-forming |
| 60 cm | 51° C. | viscous |
| 90 cm | 63° C. | plastic |
| 120 cm | 62° C. | plastic |
| 150 cm | 51° C. | plastic |

A plastic film was obtained after 15 minutes of irradiation, which was detached from the stainless steel strip by pulling.

Thereafter phase d is performed as described in Example 1.

The film was fragmented and the fragments were dried in a ventilated tunnel heated to 40° C. for 30 minutes.

The product was subsequently ground to powder form.

The resultant polymer which contains no insoluble matter, had the following properties:

| Brookfield viscosity | aqueous solution | 175 cpo |
| --- | --- | --- |
| | saline solution | 160 cpo |
| intrinsic viscosity | | 13.9 dl/g |
| concentration of residual monomer | | 0.02 |

EXAMPLE 3

The procedure as described in Example 1 is employed with the following solution of monomers:

| acrylamide | 45.6 kg |
| --- | --- |
| acrylic acid | 16.9 kg |
| 50% strength by weight sodium hydroxide solution | 18.8 kg |
| demineralized water | 68.7 kg |
| feed rate of the solution | 36 l/hour |

Photoinitiator solution of 34 g of isopropylbenzoin ether per liter of acrylic acid, feed rate: 96 cm³/hour.

pH regulated to 13
travel speed of the stainless steel strip: 30 cm/min
total duration of the irradiation phases b and c: 12 min
thickness of the layer of solution: 4.15 mm.

The irradiation was modified in the following way: over the first 30 centimeters the irradiation was effected by means of two low pressure mercury vapor lamps such as those used in Example 1. Over the next 210 cm the irradiation was effected by means of 28 lamps identical to the first lamps. Over the final 120 centimeters the irradiation was effected by means of two HTQ7 lamps such as those used in Example 1.

The table of operations is as follows:

| Irradiation length | Surface temperature |
| --- | --- |
| 60 cm | 28° C. |
| 90 cm | 38° C. |
| 120 cm | 44° C. |
| 150 cm | 32° C. |

After irradiation on the strip for 12 minutes the polymer film obtained was detached by pulling and the irradiation phase d was effected on the said film as described in Example 1.

The film was fragmented and the fragments were dried in a ventilated tunnel at 85° C. for 15 minutes. The product was subsequently ground to powder form.

The product powder, which contains no insoluble matter, had the following characteristics:

Brookfield viscosity of a solution of 5 g of polymer per liter of demineralized water containing 50 g of sodium chloride

| Brookfield viscosity | 310 cpo |
| --- | --- |
| intrinsic viscosity | 17.4 dl/g |
| residual monomer | 0.05% |

EXAMPLE 4

The procedure described in Example 1 was employed with the following monomer solution:

| acrylamide | 80 kg |
| --- | --- |
| ethyl-trimethylammonium methacrylate chloride | 20 kg |
| demineralized water | 100 kg |
| Feed rate of the solution | 31 l/hour |
| Solution of 34 g/l benzoin isopropyl ether in isopropanol, feed rate | 110 cm³/h |
| pH of the solution about | 4.4 |
| Speed of travel of the stainless steel strip | 24 cm/min |
| Total duration of the irradiation phases b and c | 15 min |
| divided as follows | over the first 165 centimeters there were 23 TLAK lamps and over the remaining 295 cm there were two HTQ7 lamps |

The polymer was detached from the carrying strip and the sheet was subjected to irradiation phase d for 60 mins, this being of the same nature as that used for the first 165 centimeters.

The resultant polymer, which contained no insoluble matter had the following characteristics:

| Brookfield viscosity | aqueous solution | 1,770 cpo |
| --- | --- | --- |
| | saline solution | 57 cpo |
| residual acrylic monomer in % of dry weight | | 0.06 |
| ethyl-trimethylammonium methacrylate chloride in % of dry weight | | not detectable |

While the fundamental novel features of the invention as applied to the preferred embodiments have been described and pointed out, those skilled in the art will appreciate that various modifications, changes and omissions in the process for the preparation of acrylic polymers can be made without departing from the nature and spirit of the invention. It is the intention, therefore, to be limited only by the scope of the claims which follow.

What is claimed is:

1. A method for the preparation of water-soluble acrylic polymers comprising:
    (a) continuously depositing on a support a thin layer of an aqueous solution comprising acrylic monomer and a photopolymerization initiator, said solution being substantially free of dissolved oxygen;
    (b) subjecting the thin liquid layer on the support to a first radiation stage comprising exposure to radiation of wavelengths between about 300 and 450 mµ and of average power between about 20 and 300 watt/m² for approximately 1 to 20 minutes in a gaseous atmosphere substantially free of oxygen while cooling said support to remove the heat of reaction;

(c) maintaining the cooled support in said oxygen free atmosphere while subjecting same to a second radiation stage comprising exposure to radiation of wavelengths between about 300 and 450 mµ and of average power between about 300 and 2000 watt/m² for approximately 1 to 20 minutes; and (d) detaching the resultant partially solidified layer from the support.

2. The method as defined in claim 1, wherein said aqueous solution comprises polymerization modifiers.

3. The method as defined in claim 1, wherein said aqueous solution has an initial pH between about 8.0 and 13.5.

4. The method as defined in claim 1, wherein said aqueous solution has an initial pH between about 3.0 and 6.0.

5. The method as defined in claim 1, wherein said acrylic monomer is selected from the group consisting of acrylamide, acrylic acid and its alkali metal salts, alkyl acrylate, aminoalkyl methacrylate and its quaternized derivatives and mixtures thereof.

6. The method as defined in claim 5, wherein said monomer comprises between about 20 to 60% by weight acrylamide or acrylamide and alkali metal acrylate.

7. The method as defined in claim 6, wherein said monomer comprises between about 40 to 50% by weight acrylamide or acrylamide and alkali metal acrylate.

8. The method as defined in claim 5, wherein said monomer comprises between about 40 to 85% by weight quaternized aminoalkyl methacrylate.

9. The method as defined in claim 8, wherein said monomer comprises between about 60 to 80% by weight quaternized aminoalkyl methacrylate.

10. The method as defined in claim 5, wherein said monomer comprises between about 40 to 70% by weight acrylamide and quaternized aminoalkyl methacrylate.

11. The method as defined in claim 2, wherein said polymerization modifiers are present in the proportion of between about 0.1 to 6.0% by weight relative to said monomer.

12. The method as defined in claim 2, wherein said polymerization modifiers are selected from the group consisting of isopropanol and glycerol.

13. The method as defined in claim 1, wherein said photopolymerization initiator comprises about 0.005 to 1.0% by weight relative to said monomer.

14. The method as defined in claim 13, wherein said photopolymerization initiator comprises about 0.01 to 0.5% by weight relative to said monomer.

15. The method as defined in claim 1, wherein said photopolymerization initiator is benzoin isopropyl ether.

16. The method as defined in claim 1 wherein said aqueous solution contains less than about 1 mg of dissolved oxygen.

17. The method as defined in claim 16, wherein said aqueous solution contains less than about 0.5 mg of dissolved oxygen.

18. The method as defined in claim 1, wherein said first radiation stage comprises exposure to radiation of wavelengths between about 330 and 400 mµ.

19. The method as defined in claim 1, wherein said time of exposure in said first radiation stage is approximately 3 to 7 minutes.

20. The method as defined in claim 1, wherein said time of exposure in said second radiation stage is about 3 to 10 minutes.

21. The method as defined in claim 1, wherein the gaseous atmosphere of said first and second radiation stages contain less than about 5.0% by volume of oxygen.

22. The method as defined in claim 1, wherein said oxygen concentration is less than about 0.5% by volume.

23. The method as defined in claim 1, wherein the thickness of the liquid layer deposited on the support is between 3 and 20 mm.

24. The method as defined in claim 1, wherein the concentration of residual monomer contained in said thin layer on the support is less than about 1.0% after the second radiation stage.

25. The method as defined in claim 24, wherein said residual monomer concentration is less than about 0.5%.

26. The method as defined by claim 1, wherein after detaching the resultant partially solidified layer from the support the solidified polymer is subjected to a third radiation stage comprising exposure to radiation of wavelengths between about 300 and 450 mµ and an average power between about 20 and 500 watt/m² for approximately 30 minutes to 3 hours.

27. The method as defined in claim 26, wherein said time of exposure in said third radiation stage is approximately 40 to 90 minutes.

28. The method as defined in claim 26, wherein said third radiation stage comprises exposure to radiation of wavelengths between 330 and 400 mµ.

29. The method as defined in claim 26, wherein the said third radiation stage is made without cooling.

* * * * *

UNITED STATES PATENT AND TRADEMARK OFFICE
CERTIFICATE OF CORRECTION

PATENT NO. : 4,178,221
DATED : December 11, 1979
INVENTOR(S) : Jean Boutin and Jean Neel It is certified that error appears in the above-identified patent and that said Letters Patent are hereby corrected as shown below:

Column 4, line 9, after "without", insert -- sticking to --;

Column 6, line 53, after "0.04", insert -- % -- ; and

Column 7, line 26, after "0.02", insert -- % --.

Signed and Sealed this

Tenth Day of June 1980

[SEAL]

*Attest:*

SIDNEY A. DIAMOND

*Attesting Officer*  *Commissioner of Patents and Trademarks*